United States Patent [19]

Munk et al.

[11] 4,078,030

[45] Mar. 7, 1978

[54] MOLDING OF ARTICLES FROM FIBROUS MATERIAL

[75] Inventors: Edmund E. Munk; Herbert G. Haas, both of Oberstenfeld, Germany

[73] Assignee: Werzalik-Pressholzwerk J.F. Werz Jr. KG, Oberstenfeld, Germany

[21] Appl. No.: 340,934

[22] Filed: Mar. 13, 1973

[51] Int. Cl.² .......... B29J 5/00

[52] U.S. Cl. .......... 264/109; 264/120; 264/122

[58] Field of Search .......... 264/109, 122, 119, 120

[56] References Cited

U.S. PATENT DOCUMENTS

| | | | |
|---|---|---|---|
| 2,288,072 | 6/1942 | Collins | 264/122 |
| 3,048,537 | 8/1962 | Pall et al. | 264/126 |
| 3,180,911 | 4/1965 | Muller | 264/119 |
| 3,264,380 | 8/1966 | Parsons | 264/122 |
| 3,443,817 | 5/1969 | Reiling | 264/119 |
| 3,621,092 | 11/1971 | Hofer | 264/120 |
| 3,661,688 | 5/1972 | Wheeler | 264/119 |

*Primary Examiner*—Robert F. White
*Assistant Examiner*—James R. Hall
*Attorney, Agent, or Firm*—Michael J. Striker

[57] ABSTRACT

A mass of fibrous material admixed with binder is accommodated in a space of a mold which is at least in part bounded by a surface having profiling in form of depressions and projections. The mass is compressed against the surface, and in particular it is compressed to a greater extent opposite the depressions in the surface than it is opposite the projections thereof.

8 Claims, 4 Drawing Figures

MOLDING OF ARTICLES FROM FIBROUS MATERIAL

BACKGROUND OF THE INVENTION

The present invention relates generally to the molding of articles from fibrous material, and more particularly to a method of molding articles from a mixture of fibrous matter and binding material, and to an apparatus for carrying out the method.

There are many instances where decorative moldings for application to furniture, or coffins, articles for technical use, and the like, are produced by molding these articles from comminuted fibrous material which is admixed with an appropriate binder. If these articles have projecting edges, as is frequently the case especially in decorative objects provided with depressions and projections to form a pattern, it is very often observed that at the edges of the projections the surface of the object is not smooth but porous. The cause of this is that during the press molding relative displacement of material takes place in these regions during the movement of the mold members, resulting in a lack of homogeneity of the material in these regions. This is caused by the fact that the material available for forming a clearly defined non-porous edge is displaced during such movement and that there is therefore right at the critical line where the edge is to be formed, not sufficient material present for a requisite molding pressure to develop. This means that a closed non-porous surface with a sharp edge is often impossible to obtain in the molding of such objects.

SUMMARY OF THE INVENTION

It is a general object of the present invention to overcome this disadvantage of the prior art.

More particularly it is an object of the present invention to provide an improved method of molding objects of the type under discussion, which avoids the aforementioned disadvantages.

Another object of the invention is to provide an apparatus for carrying out the novel method.

In keeping with these objects, and with others which will become apparent hereafter, one feature of the invention resides in a method of making molded articles having a surface provided with projections and hollows. The method comprises the steps of confining a mass of fibrous matter admixed with a binder in a space which is at least in part bounded by a side having profiling which is the mirror-reverse of the desired projections and hollows in the article. Thereupon, the mass is compressed against the profiling to an extent which is greater opposite the projections being formed (i.e., opposite the corresponding recesses in the aforementioned side) than it is opposite the hollow being formed (i.e., opposite the projections in the aforementioned side, whereby to obtain clearly defined molded projections.

With the invention we achieve that even if there is a lateral displacement of the material in the region where the edge is to be formed, due to the formation of so-called "bridges," a sufficient pressure will develop in the region where the edge is to be formed, to assure the formation of a smooth non-porous surface defining a clear-cut edge. An apparatus for making molded objects according to the method comprises, also briefly stated, a first mold section having a first surface formed with projections and depressions which are to produce valleys and hills, respectively, in the objects being molded. A second mold section has a second surface adapted to be juxtaposed with the first surface and to define therewith a space accommodating the mixture being molded. The second surface has ridges each of which registers with one of the depressions of the first surface when the surfaces are juxtaposed to define the aforementioned space, so as to subject the mixture in this space to greater compression intermediate the registering ridges and depressions than elsewhere in the space.

It is advantageous if the ridges have blunt sides facing the respective depressions, and these blunt sides may either be provided by rounding the ridges or by providing them with surfaces which are flat and juxtaposed with the first surface. This arrangement has the advantage that any bridges formed by the material being molded are partially engaged and taken along during the relative movement of the two surfaces for molding purposes, whereby the lateral escape or displacement of a significant portion of the material can be avoided. On the other hand, the blunt configuration avoids the possibility that the fibers coming into pressure contact with the ridges might be severed.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENTS

Figure 1:
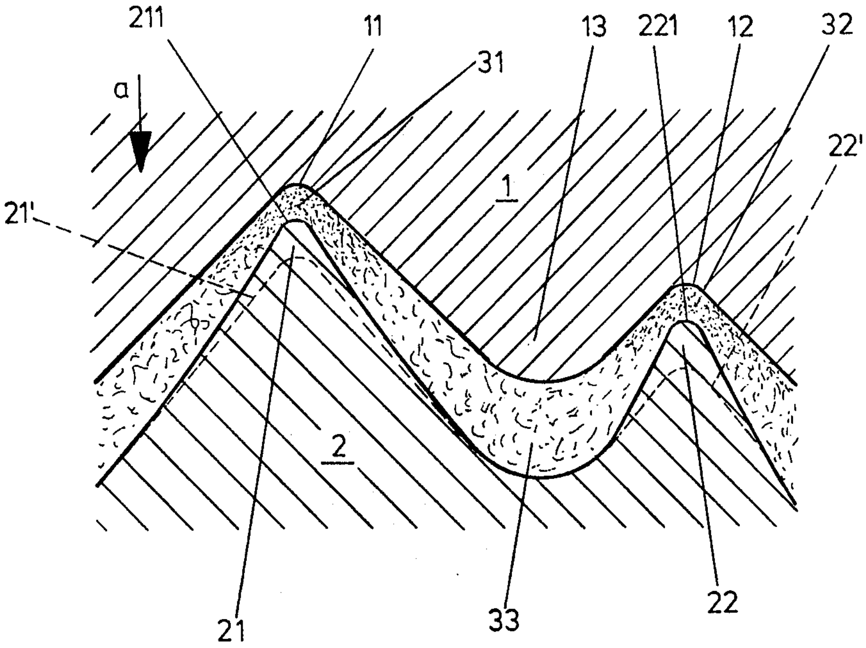
FIG. 1 is a fragmentary sectional view showing a portion of a first mold in an apparatus according to the invention.

It will be noted that in the drawing all Figures are merely diagrammatic, and that such well known components as means for effecting relative movement between the mold sections have been omitted for the sake of clarity and because they do not form a part of the invention.

With this in mind, it will be seen that in FIG. 1 reference numeral *a* and the associated arrow designate the direction of movement of a mold section 1 which moves from above into a mold section 2, the latter accommodating the material to be molded. In this embodiment it is the contour of the surface of the mold section 1 facing the mold section 2 which determines the hills and valleys to be formed in the object to be molded. For purposes of explanation it is assumed that it is here desired to form the object with hills 31, 32 and valleys 33.

The surface of the mold section 1 facing the mold section 2 is provided with a relatively far outwardly extending projection 13 forming the valleys 33, and recesses 11, 12 forming the projections 31, 32 in the object being molded.

In the prior art the molding of the projections 31 and 32 would result in the formation of porous non-smooth surfaces at the innermost portions of the recesses 11, 12 of the mold section 1.

Turning to the mold section 2 it will be seen that the contour of the surface facing the mold section 1 corresponds only approximately to the contour of the juxtaposed surface of the latter mold section. The mold section 2 is provided with a projection 21 which can enter into the recess 11, and with another projection 22 which can enter into the recess 12. The usual compacting ratio in the molding of such objects is approximately 1:5; to obtain this, the mold section 2 would have to have an exposed surface juxtaposed with the mold section 1 which has the broken-line contours 21′, 22′. As the drawing clearly shows, however, the projections 21 and 22 extend considerably beyond the respective contours 21′ and 22′ with the result that during normal molding, that is when the mold section 2 and the mold section 1 are compressed to the extent required to obtain the usual compression ratio, this usual compression ratio will be obtained for the object being molded in general, but not in the portions of the object which are being molded by the recesses 11 and 12 of the mold section 1. Rather, in these recesses the material of the object will be subject to significantly greater molding pressure than, for instance, in the portion 33 of the object. Even if the material, such as comminuted fibrous material admixed with a synthetic plastic binder, tends to the formation of bridges and material is displaced to some extent out of the recesses 11 and 12 during the molding movement, that is during the compressing stroke of the mold section 1 relative to the mold section 2, or vice versa, sufficient pressure will be exerted in the region of the recesses 11, 12 to produce the surface of the object being molded in such a manner that it is smooth and free from pores.

It should be noted that the edges 221 of the projections 22, which is a rib of the mold section 2, and the edges 211 of the projection 21 which is also a rib of the section 2, are blunt. In the illustrated embodiment of FIG. 1 they are slightly rounded in order to assure that the least possible amount of displacement of material within and without of the recesses 11 and 12 will be caused by the ribs 21 and 22, and also in order to prevent the possible damage to the fibers of this material.

Figure 2:
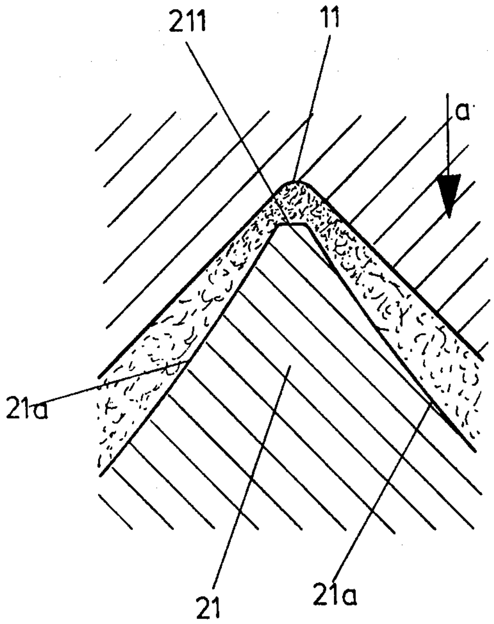
FIG. 2 is a view similar to FIG. 1 showing a somewhat different embodiment.

The embodiment of FIG. 2 is essentially the same as that of FIG. 1 except that the configuration of the edge 211 of the projection or ridge 21 is somewhat different from the embodiment of FIG. 1. In FIG. 2, wherein like reference numerals designate like components, the blunt rib 21 has a face which is flat at the bottom of the recess 11 as illustrated. It merges into the side faces **21*a* bounding the rib 21 and is very slightly rounded where it so merges. This embodiment provides an even better protection against lateral displacement of the fiber bridges when the rib enters into the recess of the mold section 1**.

Figure 3:
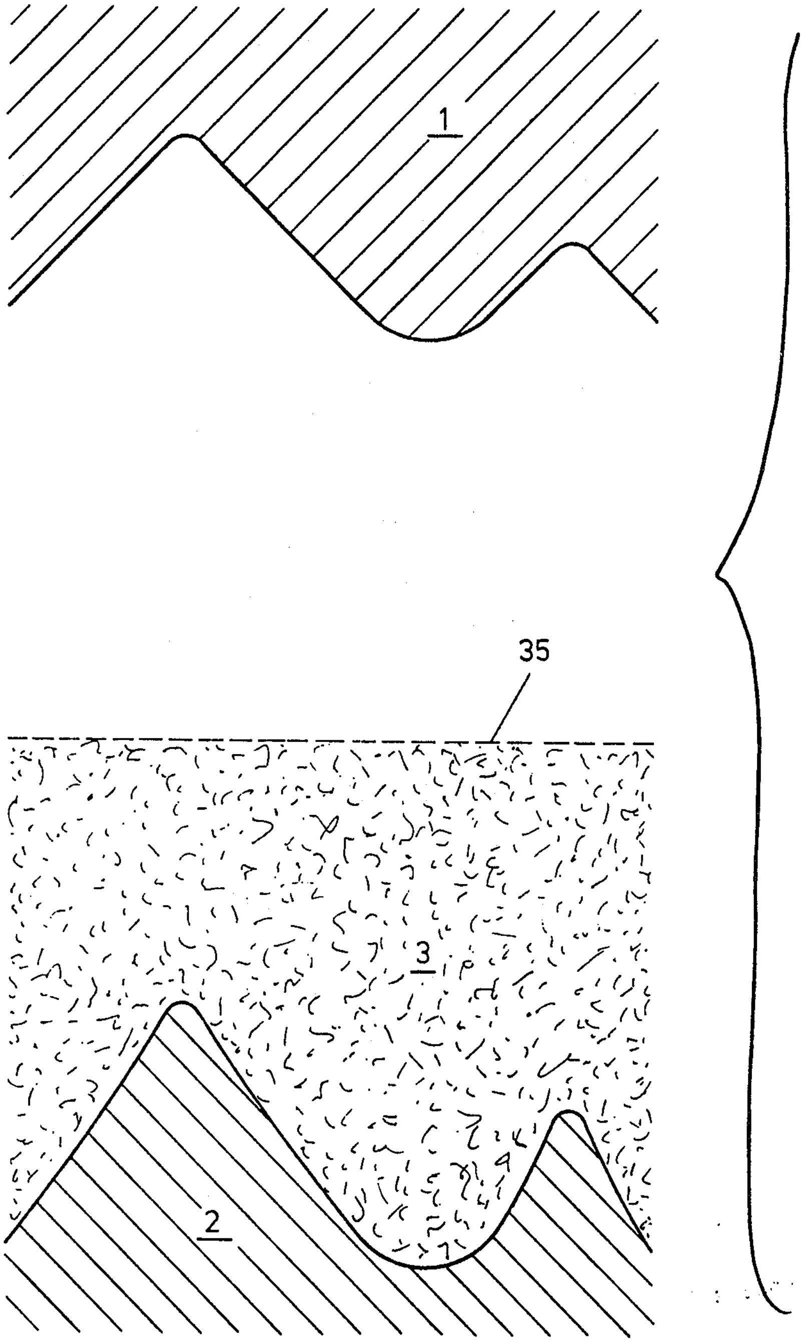
FIG. 3 shows the mold of FIG. 1 in open condition.

FIG. 3 illustrates the mold sections of FIG. 1 but showing them separated in preparation for movement to the position shown in FIG. 1. The material to be molded is designated with reference numeral 3 and it will be seen that it is so placed onto and into the mold section 2 as to have a planar upper surface 35.

Figure 4:
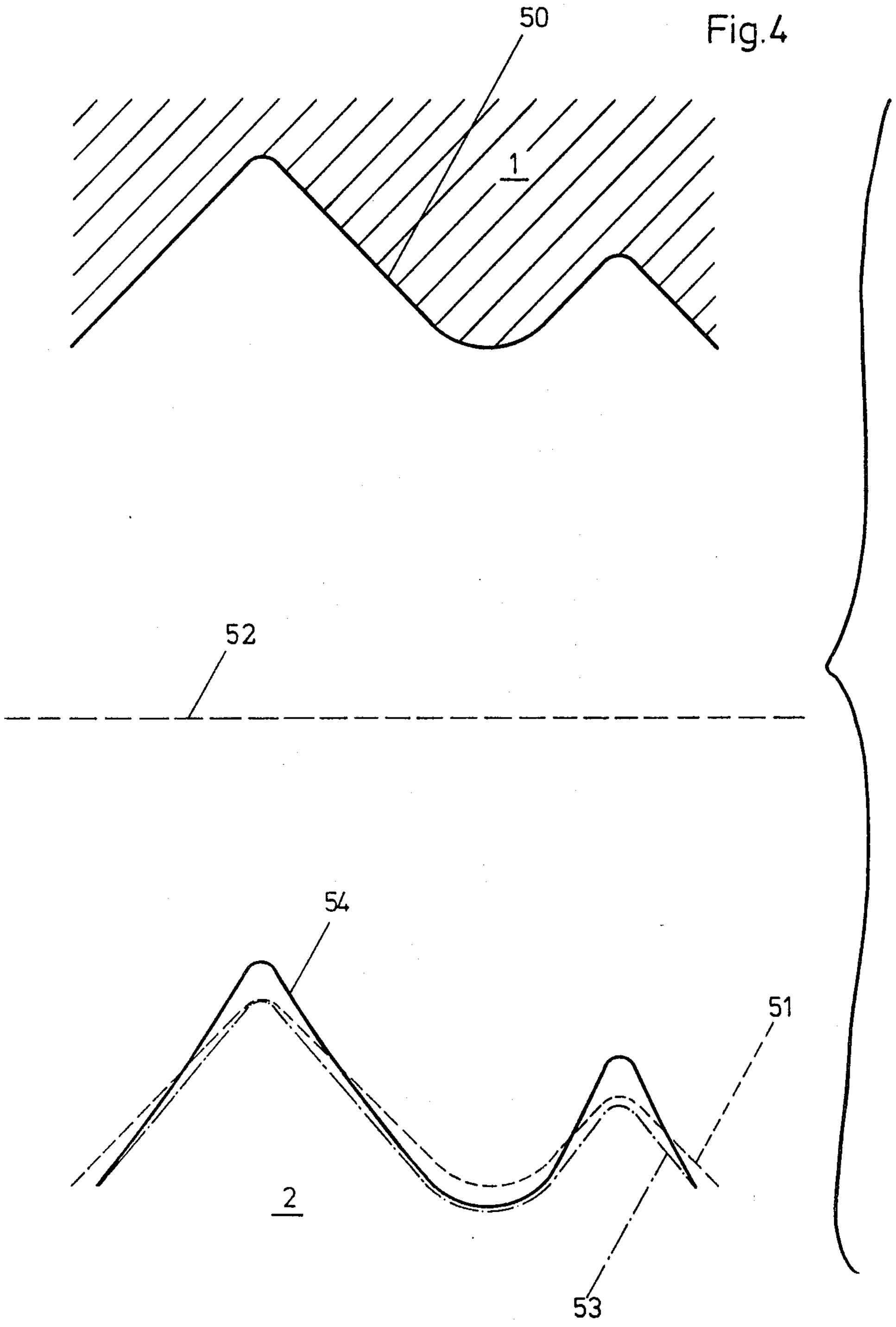
FIG. 4 is an exploded view showing dimensional relationships of the mold sections.

To produce the molds of the apparatus according to the present invention we have found it advantageous, as indicated in FIG. 4, if the mold section 1 is provided on its exposed surface 50 with a projection of the profiling corresponding to the desired hills and valleys to be produced in an object being molded. This is done, taking into consideration the desired minimum wall thickness at normal compression and with the assumption that the material to be molded will be poured onto the section 2 so as to form an even surface above the same. A similar projection for the profiling is made on the exposed surface of the mold section 2, as indicated by the broken line 51. Now taking into consideration that the material to be molded is so poured onto or into the mold section 2 that it forms an upper even horizontal surface 52, meaning that the height of the material is different over different portions of the mold section 52, the originally traced profile of the surface of the mold section 2 is slightly changed in those areas where the height of the material to the surface 52 will be greatest. The arrangement is made such that despite the greater thickness or height of the material in these areas, a compression ratio of a desired magnitude, for instance 1 : 5, will be achieved during the compression. This may then for instance result in the profile indicated with the broken-line reference numeral 53. At those portions of the surface of the mold section 2 which are to be juxtaposed with the recesses in the surface 50 of the mold section 1, which recesses of course form projections in the finished molded object, and where consequently greater compression of the material is desired, the surface of the mold section 2 is then further modified so as to project outwardly beyond the initial contour line 51 to the extent indicated by the full line 54. The proper configuration for the surface of the mold section 2 has now been obtained, and the mold section 2 is produced with a so configurated or profiled surface, that is according to the full line 54 in FIG. 4.

The molding of objects of the type in question normally makes it desirable that the female mold section, that is here the mold section 2, be relatively flat and a compression ratio of 1:5 or 1:7 is usually desired, which ordinarily must be uniform everywhere. This means that according to conventional practice, the arrangement of the female mold section is such that when material is poured onto them (in FIG. 4) the distance from the upper planar surface of the poured material to the lower mold recesses of the female mold section is greater than to the higher portions thereof. The calculations required to form the surface of the female mold section to take this into account, have been shown in FIG. 4, together with the additional calculations required to produce the desired additional or greater pressure in the regions of the recesses 11 and 12 of the male mold section 1.

The present invention can be utilized in various approaches. It is useful for applications in which the material 3 is filled into or onto the female mold section 2 and is immediately thereafter subjected to a hot-pressing operation, whereby the object is being produced in a single operating stage. The invention can, however, also be used if initially a pre-pressed blank of the object is produced in a cold-pressing operation, and finally receives in a second pressing operation under the influence of heat its final form, with the hardening of the binder material taking place during and subsequent to the second operation. The invention is, however, most advantageous in conjunction with the single-stage hot-pressing operation mentioned before. In this connection it is pointed out that in a two-stage operation in which first cold-pressing and then hot-pressing is utilized, a densification in the region of the edges of the object being formed, to a lesser wall thickness is not usually necessary during the cold pressing stage although this can be done. Actually , the densification is required only in a subsequent hot-pressing stage.

It will be seen that the present invention overcomes the disadvantages of the prior art and provides a highly desirable advantage that will be most readily recognized by those conversant with the field and by those who have attempted to clean, varnish and particularly stain molded objects of the type in question produced according to the prior art, only to find that at the corners the objects will take stain or paint in a completely different manner than over the rest of their surface, due to the high porosity in the region of the corners, with the result that the object provides a very uneven and frequently aesthetically displeasing appearance.

It will be understood that each of the elements described above, or two or more together, may also find useful applications in other types of constructions differing from the types described above.

While the invention has been illustrated and described as embodied in the molding of objects from fibrous material, it is not intended to be limited to the details shown, since various modifications and structural changes may be made without departing in any way from the spirit and concept of the present invention.

Without further analysis, the foregoing will so fully reveal the gist of the present invention that others can by applying current knowledge readily adapt it for various applications without omitting features that from the standpoint of prior art fairly constitute essential characteristics of the generic of specific features of this invention and, therefore, such adaptations and modifications should and are intended to be comprehended within the meaning and range of equivalence of the following claims.

What is claimed as new and desired to be protected by Letters Patent is set forth in the appended claims:

1. A method of making shaped articles, particularly decorative articles, provided with depressions and sharp-edged projections, comprising the steps of at least partially confining a mass which includes a fibrous substance admixed with a binder so as to obtain an at least partially confined layer having a first location corresponding to a projection to be formed and a second location adjacent said first location corresponding to a depression to be formed, said layer having a surface extending across said first and second locations; and compressing said layer in a manner to obtain a shaped article which includes a depression corresponding to said second location and a projection corresponding to said first location and which has a sharp single edge constituting the tip thereof, said compression comprising effecting a deformation of said surface so that one portion thereof defines said edge and another portion thereof defines a surface of said depression, and said compression being performed in such a manner that the degree to which said layer is compressed at said second location suffices to produce at said surface of said depression a substantially non-porous structure while the degree to which said layer is compressed at said first location exceeds that at said second location by an amount sufficient to also produce at said edge of said projection a substantially non-porous structure.

2. A method as defined in claim 1; and further comprising the step of heating said mass during the step of compressing.

3. A method as defined in claim 1; wherein the step of compressing comprises compressing said mass at elevated temperature.

4. A method as defined in claim 1, said shaped article having a surface section opposite said edge of said projection; and wherein the step of compressing said layer comprises blunting said surface section.

5. A method as defined in claim 4, wherein the step of blunting said surface section comprises rounding the same.

6. A method as defined in claim 4, wherein the step of blunting said surface section comprises imparting a substantially planar configuration to the same.

7. A method as defined in claim 1, said surface of said at least partially confined layer comprising an exposed surface thereof, and said at least partially confined layer having a smaller first thickness at said first location and a greater second thickness at said second location; and wherein the thickness of said shaped article in the region of said projection is less than the thickness of said shaped article in the region of said depression.

8. A method as defined in claim 7, wherein said exposed surface of said layer is substantially planar.

* * * * *